(12) United States Patent
Franz

(10) Patent No.: US 8,788,086 B2
(45) Date of Patent: Jul. 22, 2014

(54) PORTAL RE-POSITIONING DEVICE FOR LARGE-AREA GLASS PLATES

(75) Inventor: Roland Franz, Funfstetten (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 979 days.

(21) Appl. No.: 12/864,801

(22) PCT Filed: Jan. 27, 2009

(86) PCT No.: PCT/DE2009/000106
§ 371 (c)(1),
(2), (4) Date: Jul. 27, 2010

(87) PCT Pub. No.: WO2009/094995
PCT Pub. Date: Aug. 6, 2009

(65) Prior Publication Data
US 2010/0307999 A1    Dec. 9, 2010

(30) Foreign Application Priority Data

Jan. 31, 2008    (DE) .......................... 10 2008 006 956

(51) Int. Cl.
*G06F 7/00*    (2006.01)

(52) U.S. Cl.
USPC ........................................................ 700/218

(58) Field of Classification Search
USPC ........................................................ 700/218
See application file for complete search history.

(56) References Cited

U.S. PATENT DOCUMENTS

| | | |
|---|---|---|
| 4,400,841 A | 8/1983 | Bresnahan et al. |
| 4,763,864 A | 8/1988 | Healy |
| 6,543,605 B2 | 4/2003 | Faitel |
| 6,701,064 B1 | 3/2004 | De Haan et al. |
| 2006/0099064 A1 | 5/2006 | Anaki et al. |
| 2010/0106288 A1* | 4/2010 | Strass ........................... 700/218 |

FOREIGN PATENT DOCUMENTS

| | | |
|---|---|---|
| AT | 501323 A2 | 8/2006 |
| DE | 1506502 A1 | 7/1969 |
| DE | 3047593 | 11/1981 |
| DE | 3518640 | 11/1986 |
| DE | 9318902 | 2/1994 |
| DE | 19712368 | 10/1998 |
| DE | 20102520 | 7/2001 |
| DE | 102005060452 | 6/2007 |
| EP | 1 394 840 A2 | 3/2004 |
| JP | 2000-108066 A | 4/2000 |
| KR | 10-2004-0028872 | 4/2004 |

* cited by examiner

*Primary Examiner* — Ramya Burgess
(74) *Attorney, Agent, or Firm* — Duane Morris LLP; J. Rodman Steele, Jr.; Gregory M. Lefkowitz

(57) ABSTRACT

The invention relates to a method and device for changing the position of large-area glass plates which are stationary or moving, having the following features: one or more devices located on a level plane, each having a plurality of suction devices (12), are connected to the glass plates (10) to be re-positioned by means of a vacuum, b) the devices are connected to a lifting column (4) in a rotatable and pivotable manner, c) the devices can travel horizontally in the gripping area of the glass plates (10), d) the lifting column (4) has a counterweight (5) supplied with compressed air to compensate for the moving weight of the devices, e) the suction device (12) disk caps are spring-loaded in their holders, can be tilted in every direction, and are provided with a filter element (27), f) a controllable vacuum can be applied to each of the suction devices (12) individually, with a computer program as the controller.

19 Claims, 4 Drawing Sheets

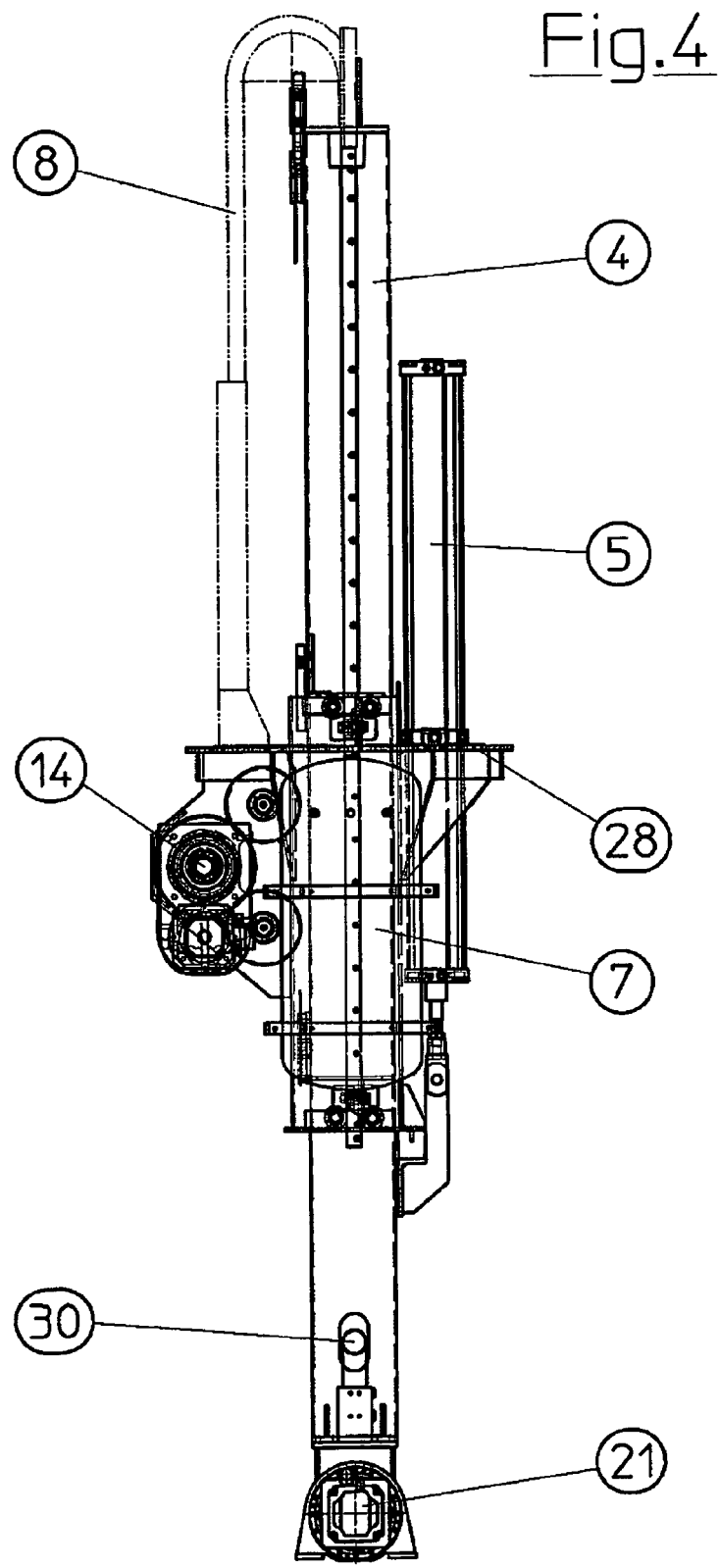

PORTAL RE-POSITIONING DEVICE FOR LARGE-AREA GLASS PLATES

CROSS-REFERENCE TO RELATED APPLICATIONS

This application is a §371 national stage entry of International Application No. PCT/DE2009/000106, filed Jan. 27, 2009, which claims priority to German Patent Application No. 10 2008 006 956.6, filed Jan. 31, 2008, both of which are hereby incorporated by reference.

FIELD OF THE INVENTION

Float glass is produced by continuously pouring molten glass onto a tin bath heated in an elongate tank and thereby creating a ribbon of glass.

BACKGROUND

The subsequent operation of making float glass involves longitudinally and transversely cutting the ribbon running at a certain rate of advancement from the float glass fabrication. The longitudinal cutting is performed here in the appropriate position by means of the longitudinal cutting wheels installed in a stationary manner above the ribbon and the transverse cutting is performed by means of cutting bridges and transverse cutting wheels moved transversely on said bridges over the ribbon.

In this way, glass plates of a considerable size can be produced. The sheet fabrication size or PLF refers to a size of 6 meters by 3.21 meters and the divided sheet fabrication size or DLF refers to a plate size of 3.21 meters by 2 meters (up to 2.5 meters).

In order to transport glass plates of such a size from one location to another without them breaking, holding mechanisms are used, usually in the form of an intrinsically stable frame, up to which the glass plate concerned is moved and to which it is connected by means of suction cups, and then the holding mechanism with the glass plate attached to it by suction is transported further.

In principle, the same operation is performed as in the case of the manual transportation of relatively small glass plates by means of handgrips together with suction cups.

A method for relocating objects from a first location to a second location using a holding mechanism that keeps the object secured to it during the relocation is known from the prior-art document DE 197 12 368 A1, with the intention of solving the problem of developing this method in such a way that objects can be safely relocated in a simple manner under any circumstances. Mentioned there as objects to be relocated are glass sheets. According to the characterizing clause of claim 1, this problem is solved by moving the holding mechanism up to the object to be relocated or moving it to the first or second location while taking into consideration the actual position and/or alignment of the same, the holding mechanism being aligned if required about one or more axes by utilizing a capability it has to rotate and/or pivot freely.

In a device claim that is also claimed, claim 7, it is explained in more detail that the object to be relocated is a glass sheet, the first location is a framework for a shipper, the second location is a conveyor belt and the holding mechanism is a suction frame. Furthermore, reference is also made in conjunction with the holding mechanism to signaling devices, decoupling devices, a picking-up device and a control device.

However, there is no disclosure in this document of an actual embodiment of particular means for quickly and reliably picking up and quickly accepting very large glass plates.

In DE 10 2005 060 452 A1, the preamble of claim 1 is based on a handling device for flat materials comprising a carrier frame with at least one suction frame, with evacuable suction heads, arranged in a carrying surface, for accepting flat materials to which suction can be applied.

According to the statements made in this document, it is intended in the case of such a device to solve the problem of providing a handling device for flat materials that can handle different formats and also, for example, alternatively coated and uncoated flat materials, and at the same time is of a structural design that is as simple as possible.

The invention or the solution to this problem is in this case that the carrier frame can be pivoted between a substantially vertical position and a substantially horizontal position of the carrying surface, the carrying surface being optionally able to pivot into a horizontal position with upwardly facing suction heads or a horizontal position with downwardly facing suction heads.

This document also does not contain any indication of an actual embodiment of particular means for quickly and reliably picking up and quickly accepting very large glass plates.

SUMMARY OF THE INVENTION

The device according to the invention and the corresponding method therefore address the problem encountered when very large glass plates are in an arbitrary position on a production line of picking up the glass plate in the shortest time, accepting it without any vibration, transporting it to a specific location and safely stacking it.

This problem is solved by a portal re-positioning device or a device with the features of claim 1 or 2 and by a corresponding method according to claim 6.

BRIEF DESCRIPTION OF THE DRAWINGS

The invention is described in more detail below with reference to figures, in which specifically:

FIG. 4 shows a sectional drawing through a lifting column.

DETAILED DESCRIPTION

Figure 1:
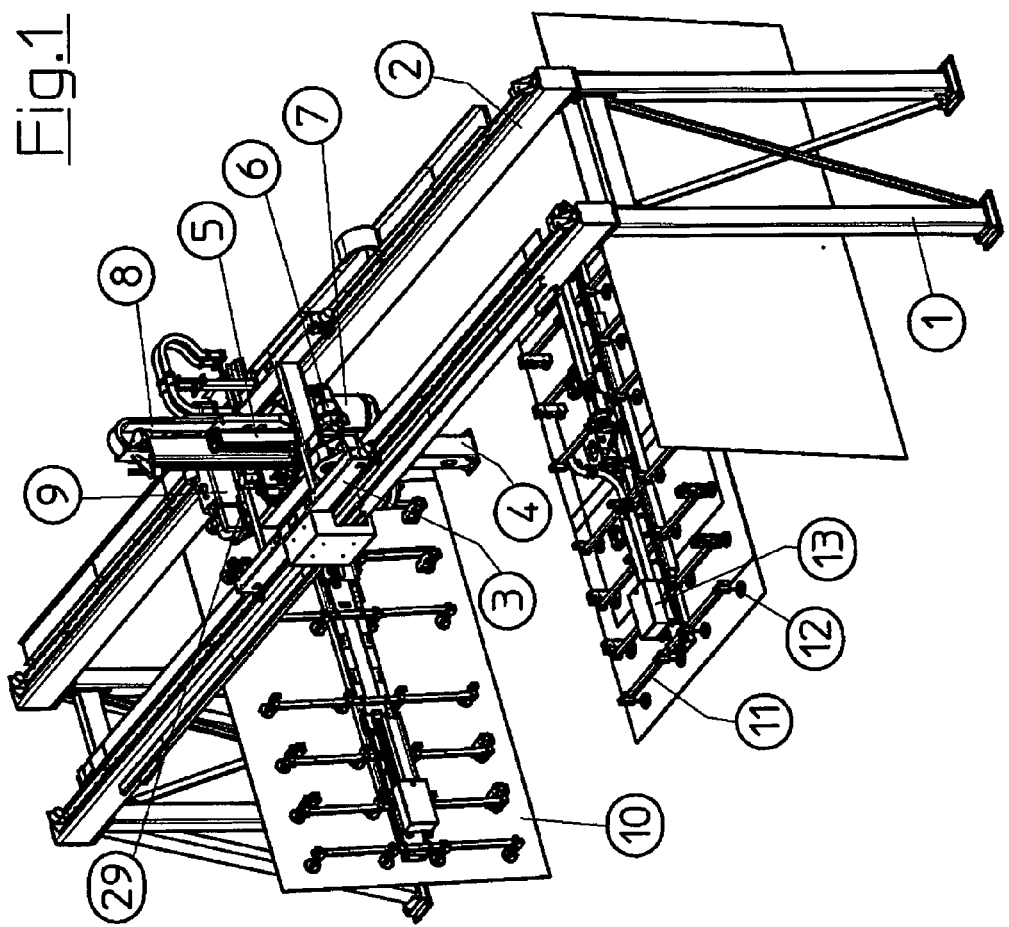
FIG. 1 shows a perspective representation of the overall device according to the invention

In FIG. 1 it can be seen how the portal supports (1), connected by the wide-spanning guide beams (2), to a certain extent form a wide portal, which gives the portal re-positioning device its name. This stable construction ensures that on the one hand sufficient space is created between the portal supports (1) to allow even very large glass plates (10) to be accepted and brought to the desired stowing place, and on the other hand that the positioning accuracy of the column carriage (3), which carries the lifting column (4), is retained even when very large and very heavy glass plates (10) are handled. According to the invention, this is achieved in particular by the overall weight resulting from the weight of a glass plate (10) and the additional weight of the construction holding it in the manner of a balance being compensated in such a way that only the weight of the respective glass plate (10) is taken as a basis as a control parameter. The difference in weight between the overall weight of a glass plate (10) and the device picking it up, which substantially comprises the suckers (12) and the construction carrying them, is brought about by controlling compressed air in the counterbalance weight (5). That is to say that this difference in weight is applied by way of a pressure cylinder in accordance with the lever principle on the opposite side of a lever system and thereby balances out the difference in weight. In this way, the loading parameters that correspond to the actual weight and the moments of inertia of the glass plate (10) respectively to be re-positioned are transmitted to the controller of the portal re-positioning device.

The compressed air required for this operation is stored in the compressed air tank (7). This achieves the overall effect that the toothed belts transmitting the movement of a specific glass plate (10) are not subjected to inadmissible loading. The effect is also achieved that the flanks of the toothed belts that are used are only subjected to loading on one side and the overall control can consequently take place very precisely. With this device it is of course also possible as it were to "overcompensate" the weight of a glass plate (10) and make it appear lighter for the re-positioning operation than its actual weight. Such a procedure may appear to be appropriate on occasion when re-positioning glass plates (10) that are particularly heavy. Of course, it must be taken into account in this case that the overall weight that is admissible for the portal re-positioning device is not exceeded.

The horizontally acting carriage drive (6) in the form of a servo motor moves the column carriage (3). The energy supply and controlling means for the lifting column (4) run in the cable duct (8). The vacuum pump (9) supplies the negative pressure required for the respective suckers (12), the suckers (12) being fastened to the transverse beams (11) running transversely in relation to the roller conveyor. The electrical equipment is accommodated in the switch cabinet (13) that can be seen in FIG. 1 in the region of the forwardmost sucker (12). Furthermore, the drive (29) for the rotary ring (28), shown in FIG. 2, can be seen in FIG. 1. Furthermore, a glass plate (10) is represented in a horizontal position in FIG. 1, in connection with a suction device but without a mechanical connection to a lifting column (4), to demonstrate the position when it is accepted by conveying rollers (17).

Figure 2:
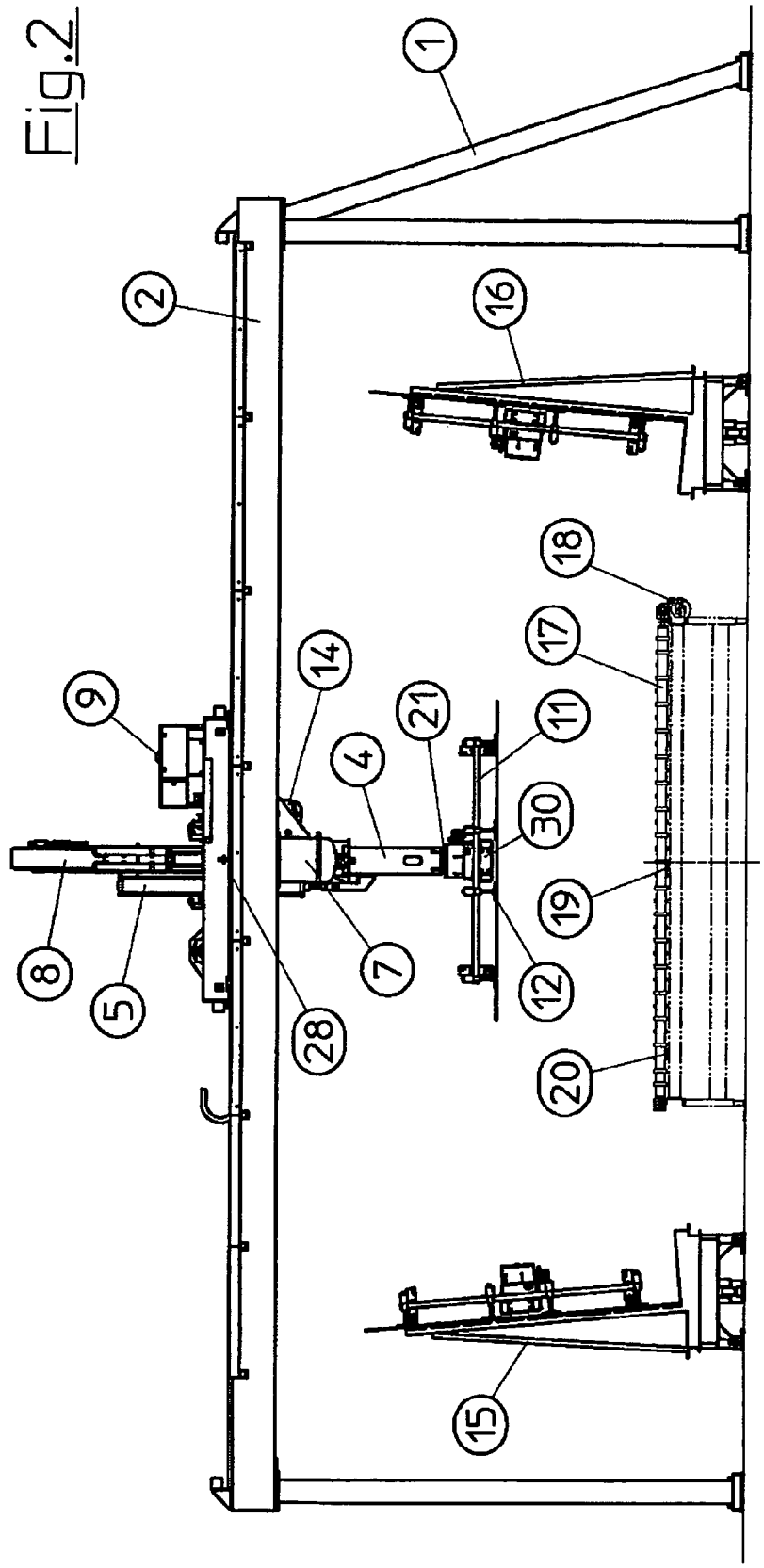
FIG. 2 shows a sectional drawing through the overall device

The devices mentioned can for the most part also be seen from the sectional drawing of FIG. 2. The column drive (14), which in the form of a servo motor performs the vertical movement of the lifting column (4), can additionally be seen here.

A stacking framework (15) is represented in section on the left-hand side and a stacking framework (16) is represented in section on the right-hand side.

Depicted in the middle is the mounting for a glass plate (10) by means of conveying rollers (17), which are driven by a drive (18). Serving by way of example for picking up the dimensions of the glass plate (10) respectively to be re-positioned are a middle sensor (19) and an outer sensor (20). Still further sensors in the region of the guide beam (2), which operate on the basis of lasers and/or ultrasound, may also serve for the additional picking up of the speed of the glass plate (10) approaching the portal at a specific speed. The output signals of these sensors then make it possible for the control center to automatically access the portal re-positioning device according to the invention at a specific point in time, or to access a specific glass plate (10).

A rotating and pivoting device (21) at the lower end of the lifting column (4) makes it possible for the overall sucker device to rotate and/or pivot about a horizontal axis in two opposite directions and serves substantially for re-positioning the glass plate (10) picked up.

The overall lifting column (4) can rotate in the toothing of the rotary ring (28), the latter being driven by the drive (29), as can be seen from FIG. 1. The rotary ring (28) can be seen in more detail in FIG. 4.

Figure 3:
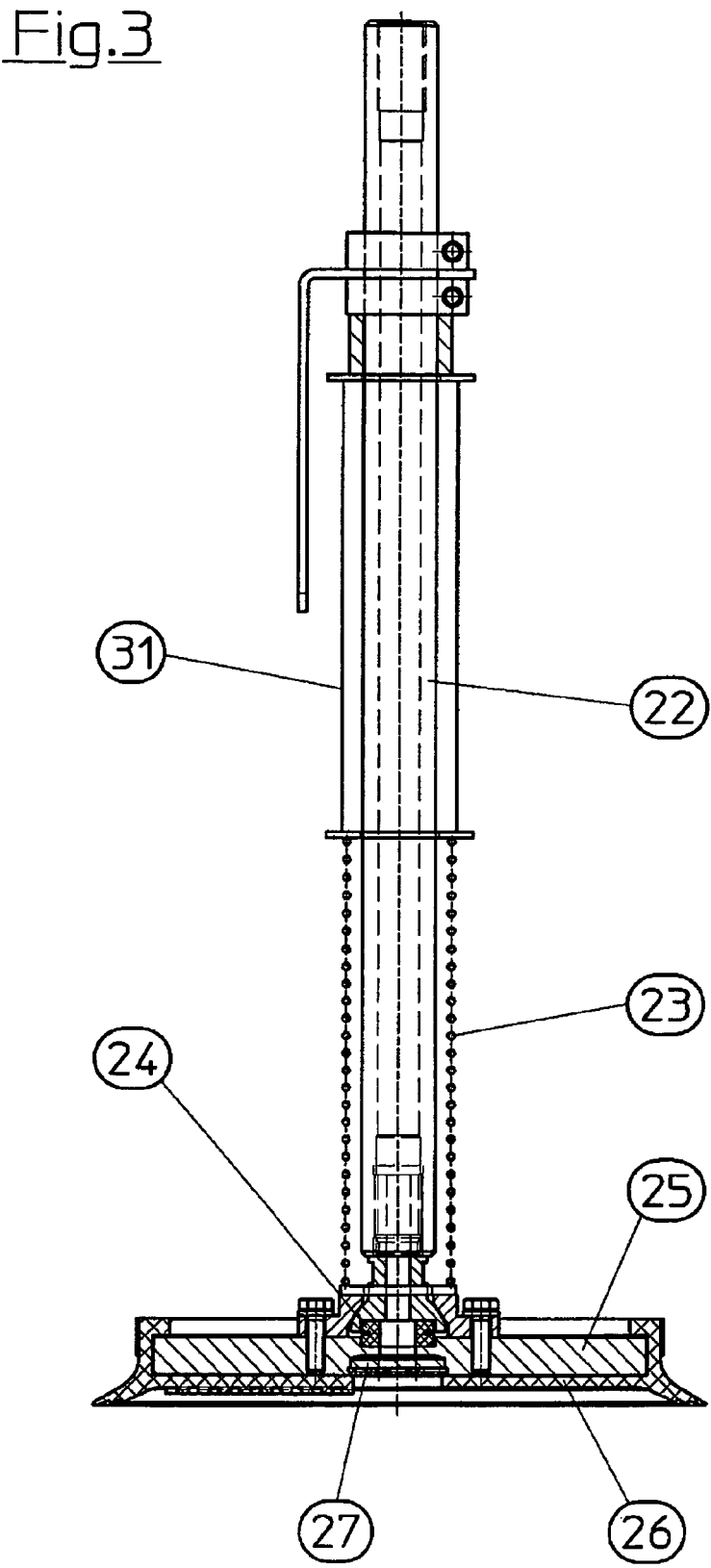
FIG. 3 shows a detailed drawing of a sucker

The sucker (12), shown in the detailed drawing of FIG. 3, substantially comprises a sucker shank (22), which is inserted in a guiding and mounting tube (31), and a suction disk (25) fastened thereto. A compensating spring (23), which is mounted between a guiding and mounting tube (31) and the suction disk (25), on the one hand ensures gentle setting down of the suction disk (25) on the glass plate (10) and on the other hand supports the flexible suction disk mount (24) when it adopts a slanting position. This suction disk mount (24) is produced from a material which is soft but has good shock absorption and represents a particularly harmonious connection between the sucker shank (22) and the suction disk (25). The circular sucker collar (26), with its peripheral lip that sticks particularly well, establishes the actual connection with respect to the glass plate (10). The suction disk (25) has in its middle a circular filter element (27). This serves the purpose of keeping fine glass particles away from the vacuum pump (9).

It may either be cleaned manually or exchanged at certain intervals. In a particular development stage, the flow resistance of the filter element (27) of each sucker (12) can be picked up and displayed on a monitor by a sensor that is not separately shown. In a further stage of development, it may be provided that, for the re-positioning of particularly long and narrow glass plates (10), which are narrower than the transverse beams (11), individual suckers (12) can be switched off, or that each sucker (12) can be subjected individually on its own to adjustable air under negative pressure. It has been found that the number and exact position of the suckers (12) used play a decisive part in picking up a very large glass plate without vibration. Therefore, it may be required to choose a specific configuration of the suckers (12) in relation to the glass plate (12) that is to be re-positioned. For this purpose, however, each sucker (12) must be capable of optionally being switched on. This variant therefore represents a further solution to the problem addressed by the invention that is independent from the solution according to claim 1.

Furthermore, it may be provided that a number of portal re-positioning devices according to the invention are arranged one behind the other and undergo joint control, or are capable of being individually activated. This makes possible the operation of re-positioning extremely long glass plates (10) and/or selectively re-positioning glass plates (10) of different dimensions, which may be sorted out from a large number of glass plates arriving.

The sectional drawing through the lifting column (4) according to FIG. 4 shows once again the parts of the installation already described in their function from a further aspect, represented in more detail. The vacuum hose (30), which leads from the lower part of the lifting column (4) to the individual transverse beams (11) with the respective placed-on suckers (12), consists of a particular material, developed for robot systems. This ensures great reliability with regard to the changing tilting and rotating loading of the lifting device.

The interactive control of the suckers (12) and the elements of the lifting column (4) in conjunction with the picking up of the format and thickness of each glass plate (10) as well as the monitoring of the positioning by means of lasers and/or sensors requires a special control program.

LIST OF DESIGNATIONS (1) Portal supports
(2) Guide beam, travel beam
(3) Column carriage, traveling car
(4) Lifting column
(5) Counterbalance weight, compensating cylinder
(6) Carriage drive, traveling car drive
(7) Compressed air tank for compensating cylinder
(8) Cable duct for lifting device
(9) Vacuum pump
(10) Glass plate
(11) Transverse beam for sucker, manifold
(12) Sucker
(13) Switch cabinet
(14) Column drive
(15) Left-hand stacking framework
(16) Right-hand stacking framework
(17) Conveying rollers
(18) Drive for conveying rollers
(19) Middle sensor
(20) Outer sensor
(21) Rotating and pivoting device
(22) Sucker shank
(23) Compensating spring
(24) Flexible suction disk mount
(25) Suction disk
(26) Sucker collar
(27) Filter element
(28) Rotary ring
(29) Drive for rotary ring
(30) Special hose
(31) Guiding and mounting tube

The invention claimed is:

1. A device for changing the position of large-area glass plates which are stationary or moving, comprising:
    a) a set of horizontal guide beams, each of said horizontal guide beams extending between and supported by a pair of portal supports;
    b) a lifting column slidably coupled to said horizontal guide beams between said portal supports;
    c) one or more rotating and pivoting devices coupled to a lower end of the lifting column; and
    d) a plurality of suckers coupled to said rotating and pivoting devices, said plurality of suckers arranged in a level plane, said suckers adapted for picking up and connecting to a glass plate to be moved by said device,
    wherein the lifting column comprises a counterbalance weight to compensate for the weight of objects being moved by said device, and
    wherein each sucker comprises a filter element and a spring loaded disk capable of tilting in all directions.

2. The device as claimed in claim 1, further comprising sensors coupled to a control system, wherein said sensors detect a position, a speed or both of a glass plate to be moved by said device, and wherein signals of said sensors are processed by said control system.

3. The device as claimed in claim 1, wherein the counterbalance weight can be adjusted infinitely.

4. The device as claimed in claim 1, wherein a flow resistance of a filter element is detected and displayed.

5. The device as claimed in claim 1, wherein said lifting column is slidably coupled to said horizontal guide beams by a column carriage and said lifting column is rotatably coupled to said lifting carriage.

6. The device as claimed in claim 1, wherein said lifting column is slidably coupled to said horizontal guide beams at an intermediate portion of said lifting column.

7. The device as claimed in claim 1, wherein said lifting column extends between said set of horizontal guide beams.

8. A device for changing the position of large-area glass plates which are stationary or moving, comprising:
    a) a set of horizontal guide beams, each of said horizontal guide beams extending between and supported by a pair of portal supports;
    b) a lifting column slidably coupled to said horizontal guide beams between said portal supports;
    c) one or more rotating and pivoting devices coupled to a lower end of the lifting column in a rotatable and pivotable manner; and
    d) a plurality of suckers coupled to said rotating and pivoting devices, said plurality of suckers arranged in a level plane, said suckers adapted for picking up and connecting to a glass plate to be moved;
    wherein the lifting column comprises a counterbalance weight to compensate for the weight of objects being moved by said device,
    wherein each sucker comprises a filter element and a spring loaded disk capable of tilting in all directions, and
    wherein vacuum applied to each sucker is independently controllable.

9. The device as claimed in claim 8, further comprising sensors coupled to a control system, wherein said sensors detect a position, a speed or both of a glass plate to be moved by said device, and wherein signals of said sensors are processed by said control system.

10. The device as claimed in claim 8, wherein the counterbalance weight can be adjusted infinitely.

11. The device as claimed in claim 8, wherein a flow resistance of a filter element is detected and displayed.

12. The device as claimed in claim 8, wherein said lifting column is slidably coupled to said horizontal guide beams by a column carriage and said lifting column is rotatably coupled to said lifting carriage.

13. The device as claimed in claim 8, wherein said lifting column is slidably coupled to said horizontal guide beams at an intermediate portion of said lifting column.

14. The device as claimed in claim 8, wherein said lifting column extends between said set of horizontal guide beams.

15. A method for changing the position of large-area glass plates which are stationary or moving, comprising:
    a) providing a device according to claim 1;
    b) detecting the dimensions of a glass plate using sensors;
    c) determining the speed of the glass plate and the point in time of the contact of a glass plate with the plurality of suckers arranged in a level plane,
    d) connecting the plurality of suckers to the glass plate by applying negative pressure to a plurality of the suckers;
    e) lifting the glass plate using the lifting column and the counterbalance weight, and pivoting the glass plate using the rotating and pivoting device; and
    f) setting down the glass plate at a target location by reducing the negative pressure applied at the suckers.

16. The method as claimed in claim 15, wherein the counterbalance weight (5) can be adjusted infinitely variably.

17. The method as claimed in claim 15, wherein more than one device according to claim 1 is arranged and controlled in a coordinated manner.

18. A computer program with a program code for carrying out the method steps as claimed in claim 15 when the program is executed in a computer.

19. A machine-readable carrier with the program code of a computer program for carrying out the method as claimed in claim 15 when the program is executed in a computer.

* * * * *